United States Patent
Ito et al.

(10) Patent No.: US 6,194,540 B1
(45) Date of Patent: Feb. 27, 2001

(54) METHOD FOR PRODUCTION OF WATER-SOLUBLE CONDUCTING POLYANILINE

(75) Inventors: Shoji Ito, Tsukuba; Kazuhiko Murata, Nishinomiya; Ryuji Aizawa, Toride; Yoshinobu Asako, Amagasaki, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/420,621

(22) Filed: Oct. 19, 1999

(30) Foreign Application Priority Data

Oct. 22, 1998 (JP) .................................................. 10-301251
Oct. 22, 1998 (JP) .................................................. 10-301252

(51) Int. Cl.$^7$ .......................... C08G 73/00; C08G 75/00; C08L 81/00
(52) U.S. Cl. .......................... 528/373; 528/210; 528/422; 528/391; 528/480; 528/487; 528/495; 528/499; 525/535; 525/540; 525/534
(58) Field of Search .................................... 528/422, 210, 528/373, 391, 480, 487, 495, 499; 525/540, 535, 534

(56) References Cited

U.S. PATENT DOCUMENTS

| 5,093,439 | * | 3/1992 | Epstein et al. | 528/210 |
| 5,208,301 | * | 5/1993 | Epstein et al. | 525/540 |
| 5,354,816 | * | 10/1994 | Shimizu et al. | 525/535 |

FOREIGN PATENT DOCUMENTS

| 0 813 212 A2 | 12/1997 | (EP) | H01B/1/12 |

OTHER PUBLICATIONS

Wei et al., "Synthesis and Physical Properties of Highly Sulfonated Polyaniline", J. Am. Chem. Soc. 118:2545–2555, 1996.

Wei et al., "Synthesis of Highly Sulfonated Polyaniline", Synthetic Metals 74:123–125, 1995

Yue et al., "Comparison of Different Synthetic Routes for Sulphonation of Polyaniline", Polymer 33:4410–4418, 1992.

Yue et al., Synthesis of Self–Doped Conducting Polyaniline, J. Am. Chem. Soc. 112:2800–2801, 1990.

Yue et al., "Effect of Sulfonic Acid Group on Polyaniline Backbone", J. Am. Chem. Soc. 113:2665–2671, 1991.

* cited by examiner

Primary Examiner—P. Hampton Hightower
(74) Attorney, Agent, or Firm—Fish & Richardson P.C.

(57) ABSTRACT

The sulfonation of a polyaniline or a derivative thereof by the use of a sulfonating agent, characterized by dispersing the polyaniline or the derivative thereof in a reaction solvent thereby inhibiting the formation of lumps of grains due to substantial aggregation. Preferably, the solvent for the reaction is an organic solvent incapable of reacting with the sulfonating agent. The initial stirring power for the reaction of sulfonation is preferred to be not less than 0.03 kW/m$^3$ and the polyaniline or the derivative thereof is preferred to have a water content of not more than 8 wt. %. Further, this invention is characterized by subjecting a polyaniline having introduced a sulfonic acid group therein or a derivative thereof to hydrolysis in a mixed solution of water with a hydrophilic organic solvent. The hydrophilic organic solvent is preferred to be an alcohol. The aqueous solution of the water-soluble conducting polyaniline obtained by the method of production mentioned above can be made to form a thin film by a simple technique such as spin coat, dip coat, or bar coat and utilized for various antistatic applications and non-linear optical materials.

18 Claims, No Drawings

METHOD FOR PRODUCTION OF WATER-SOLUBLE CONDUCTING POLYANILINE

BACKGROUND OF THE INVENTION

1. Field of the Invention

This invention relates to a method for the production of a water-soluble conducting polyaniline or a derivative thereof. The aqueous solution of the water-soluble conducting polyaniline obtained by this method of production is made to form a thin film by such a simple technique as spin coat, dip coat, or bar coat and, therefore, can be utilized in various kinds of antistatic agents, transparent electrodes, electromagnetic wave shielding materials, photoelectric converting elements, organic electroluminescence elements, organic electrochromic elements, rustproofing agents, semiconductor photocatalysts, photoresists, nonlinear optical materials etc.

2. Description of Related Art

Since the doped polyaniline or derivative thereof features stability as a conductive polymer and enjoys inexpensiveness of the raw material to be used, the utility thereof in such applications as film electrodes, secondary cells, capacitors, antistatic agents, electromagnetic wave shielding materials etc. is now being promoted. Generally, however, the polyaniline is at a disadvantage in being insoluble and infusible and allowing no easy formation or fabrication. It is, therefore, important commercially to solubilize the polyaniline and it is most advantageous economically to render it soluble in water from the viewpoint of the equipment of production.

In recent years, therefore, various techniques for the introduction of a sulfonic acid group have been proposed with a view to imparting the water-solubility to the polyaniline. For example, such methods for polymerizing an aminobenzene sulfonic acid as a monomer as a method for synthesizing a sulfonated polyaniline by electrochemically copolymerizing aniline with an o- or a m-aminobenzene sulfonic acid (JP-A-02-166, 165), a method for copolymerizing aniline with an aminobenzene sulfonic acid by dint of chemical oxidation (JP-A-01-301,714 and JP-06-56,987), a method for sulfonating a copolymer of aniline with an aminobenzene sulfonic acid, and a derivative thereof (JP-A-05-178,989), and a method for polymerizing an o-, or a m-aminobenzene sulfonic acid by dint of electrochemical oxidation and a method for polymerizing an o- or a m-aminobenzene sulfonic acid and a derivative thereof by dint of chemical oxidation (JP-A-07-324,132 and JP-A-08-41,320) may be cited.

Further, such methods for introducing a sulfonic acid group into a polyaniline through the agency of a sulfonating agent as, for example, a method for sulfonating an emeraldine salt type polymer by using a sulfuric anhydride/phosphate triethyl complex (JP-A-61-197,633), a method for sulfonating an undoped polyaniline (emeraldine base) by using fuming sulfuric acid (WO91-06887, J. Am. Chem. Soc., 1990, vol. 112, p. 2800, J. Am. Chem. Soc., 1991, vol. 113, p. 2665), a method for sulfonating an undoped polyaniline (emeraldine base) in chlorosulfuric acid (Polymer, 1992, vol. 33, p. 4410), and a method for sulfonating the polyaniline of a leucoemeraldine base with fuming sulfuric acid (J. Am. Chem. Soc., 1996, vol. 118, p. 2545) have been proposed.

The method which copolymerizes an aminobenzene sulfonic acid and a derivative thereof with aniline by dint of electrochemical or chemical oxidation introduces only one sulfonic acid group per five aromatic rings. The product of this method, though slightly soluble in an alkali, has the problem of solubility as evinced by the fact that it is insoluble in water itself. The method which further sulfonates such a polymer introduces a little over one sulfonic group per two aromatic rings. The product of this method, though soluble in an alkali, has the problem of showing no solubility in water itself.

The method which polymerizes an o- or a m-aminobenzene sulfonic acid through electrochemical oxidation is reported to have obtained a water-soluble conducting high polymer. Since this method resorts to an electrode reaction, the product is at a disadvantage in being difficult of isolation and unfit for quantity synthesis on a commercial scale. The method for polymerizing an o- or a m-aminobenzene sulfonic acid and a derivative thereof by chemical oxidation in an acidic solution or a basic solution, on trial experiment, barely forms a reddish brown oligomer-like product and fails to produce a sulfonated polyaniline having an emeraldine salt as a repeating unit. It is, generally, difficult to obtain a polyaniline having a high molecular weight and assuming the green color peculiar to the emeraldine salt by polymerizing an aniline monomer possessing a substituent.

In the methods for introducing a sulfonic acid group by using a sulfonating agent, the method which sulfonates a polyaniline by using a sulfuric anhydride/triethyl phosphate complex attains introduction of one sulfonic acid group per five aromatic rings and has the problem of solubility as evinced by the fact that the product in the form of a conductor (doped state) is completely insoluble in water. Then, the method which attains sulfonation by using fuming sulfuric acid indeed is capable of obtaining a self-doped polyaniline having introduced one sulfonic acid group per two aromatic rings and nevertheless is at a disadvantage in exhibiting insolubility in a neutral and an acidic aqueous solution and requiring to act with an alkali to become soluble therein because the sulfonic acid group is utilized in doping the aniline. The polyaniline, however, turns into an insulator generally on acting with an alkali. For this reason, the self-doped polyaniline requires to be re-doped after solution in order to be endowed with conductivity. Thus, it does not deserve the name of a fully satisfactory entity in terms of formability and fabricability.

The method which attains sulfonation in chlorosulfuric acid indeed is capable of obtaining a self-doped polyaniline having introduced four sulfonic acid groups per five aromatic rings and nevertheless is at a disadvantage in exhibiting insolubility in a neutral and an acidic aqueous solution and requiring to act with an alkali to become soluble therein because the sulfonic acid group is utilized in doping the aniline. The product of this method, therefore, is not perfect in terms of formability and fabricability. The method which sulfonates the polyaniline of a leucoemeraldine base with fuming sulfuric acid is capable of introducing three sulfonic acid groups per four aromatic rings and still is at a disadvantage in being sparingly soluble in water because of the self-doping type of occurrence. It is not perfect in terms of solubility and formability.

Further, the methods which attain sulfonation by using such fuming sulfuric acid and chlorosulfuric acid as mentioned above invariably require to use relevant sulfonating agents in a large excess relative to polyaniline for fulfilling the sulfonation and, therefore, entail the problem that the spent acids occur in large volumes and render disposal thereof difficult.

As concrete examples of the polyaniline which is in a highly conductive state, namely in a doped state, the N-sulfonated polyaniline obtained by polymerizing diphenyl amine-4-sulfonic acid through chemical oxidation (Polymer, 1993, vol. 34, p. 158), the N-propane sulfonic acid-substituted polyaniline obtained by the reaction of polyaniline with 1,3-propane sultone (J. Am. Chem. Soc., 1994, vol. 116, p. 7939, J. Am. Chem., Soc., 1995, vol. 117, p. 10055), and the phosphonated polyaniline obtained by polymerizing o-aminobenzyl phosphonic acid through oxidation (J. Am. Chem. Soc., 1995, vol. 117, p. 8517) have been known.

The N-sulfonated polyaniline, however, has the problem of entailing unusually complicated isolation because it possesses high solubility and consequently requires high speed centrifugal separation for the purpose of effecting isolation subsequently to polymerization. Then, the N-propane sulfonic acid-substituted polyaniline is a self-doped polyaniline. This polyaniline in its doped state, therefore, is not soluble in water and is not rendered soluble in water unless it is treated by an unusually complicated procedure in terms of formability and fabricability. Further, the phosphonated polyaniline has the problem of relying for commercial manufacture on a very complicated procedure because the preparation of the o-aminobenzyl phosphonic acid as the raw material for polymerization necessitates several stages of reaction. No method which is capable of producing by a simple procedure a water-soluble polyaniline in a state possessing high conductivity, namely in a doped state, has ever been reported to the art.

Polymer films, polymer fibers, molded articles of polymer etc. are electric insulators and, therefore, are liable to assume static electricity. In consequence of this static electricity, the electronic parts using them possibly sustain breakage, adsorb dust, and even form a cause for fire. The measure to protect the electronic parts against the static electricity, therefore, has become an indispensable requirement.

Heretofore, the surfactant has been mainly used as an antistatic agent which is useful for the protection in question. The surfactant exhibits an ability to conduct ions by utilizing the moisture suspended in the air. Owing to this quality, it entails such problems as rendering it difficult to lower the surface resistance thereof below $10^9 \Omega/\square$ and nearly completely ceasing to manifest the antistatic effect under the condition of low humidity. Meanwhile, electron conducting type antistatic agents produced by dispersing carbon black, minute particles of such metals as aluminum, copper, and silver, and minute particles of such semiconductors as indium oxide and fluorine-doped tin oxide as fillers in general-purpose polymers have been known in the art. These fillers, however, pose such problems as using a considerably high application rate, rendering difficult the adjustment of the electric resistance because an increase in the application rate to a certain level results in a sudden fall of the electric resistance, preventing the applied layer of the antistatic agent from forming a flat smooth surface because of prominence of the fillers to the layer surface, betraying poor transparency, and imparting only insufficient strength to the applied layer of the antistatic agent.

SUMMARY OF THE INVENTION

The properties of the polyaniline and the derivative thereof are closely related to the methods used for their production as described above. The production of the polyaniline or the derivative thereof which exhibits excellent solubility to a neutral aqueous solution is extremely difficult. Further, with a view to conserving the environment, the desirability of developing a method of production which allows easy disposal of the spent acid has been finding enthusiastic recognition. When the polyaniline or the derivative thereof to be produced happens to be used as a conducting polymer, it is required to possess an outstanding specific conductance. This invention, therefore, is directed for the manifestation of these properties at providing a novel method for the production of a polyaniline or a derivative thereof which is soluble in water in the doped state.

The objects mentioned above are accomplished by the following items (1) to (17).

(1) A method for the production of a water-soluble conducting polyaniline, characterized by adding dropwise a sulfonating agent at a rate in the range of 0.5 to 8 kg/hr of unit time to 1 kg of a polyaniline or a derivative thereof having a water content in the range of 0 to 8 wt. % and meanwhile stirring the mixture consequently formed at an initial stirring power in the range of 0.03 to 0.3 kW/m$^3$ thereby sulfonating the polyaniline or the derivative thereof and subsequently hydrolyzing the product of sulfonation.

(2) A method according to the item (1) mentioned above, wherein the sulfonating agent is a chlorosulfuric acid.

(3) A method according to the item (1) or (2) mentioned above, wherein the reaction of sulfonation is performed in an organic solvent which avoids reacting with the sulfonating agent.

(4) A method according to any of the items (1) to (3) mentioned above, wherein the polyaniline or the derivative thereof reacts in said organic solvent in a concentration of 1 to 30 wt. %.

(5) A method according to any of the items (1) to (4) mentioned above, wherein the polyaniline is an emeraldine type polyaniline.

(6) A method according to any of the items (1) to (5), wherein the polyaniline is a doped polyamine using proton acid as a dopant.

(7) A method according to any of the items (1) to (6), wherein the formation of grain lumps due to substantial aggregation of a polyaniline is inhibited during the reaction of sulfonation of the polyaniline or the derivative thereof by the use of a sulfonating agent.

(8) A method according to any of the items (1) to (7) mentioned above, wherein the aggregated lumps of the product of sulfonation of the polyaniline or the derivative thereof have the maximum size of not more than 10 mm.

(9) A method according to any of the items (1) to (8) mentioned above, wherein the hydrolysis mentioned above is carried out in a mixed solution of water with a hydrophilic organic solvent, with the concentration of the product of sulfonation of the polyaniline or the derivative thereof falling in the range of 0.1 to 30 wt. %, at a temperature in the range of 40 to 120° C.

(10) A method according to the item (9) mentioned above., wherein the mixing ratio of the water and the hydrophilic organic solvent is such that the proportion of the hydrophilic organic solvent falls in the range of 5 to 18 parts by weight, based on 1 part by weight of the water.

(11) A method according to the item (9) or (10) mentioned above, wherein the hydrophilic organic solvent mentioned above is an alcohol.

(12) A method for the production of a water-soluble conducting polyaniline, characterized by hydrolyzing the product of sulfonation of a polyaniline or a derivative thereof in a mixed solution of water with a hydrophilic organic solvent, with the concentration of the product of sulfonation kept in the range of 0.1 to 30 wt. %, at a temperature in the range of 40 to 120° C.

(13) A method according to the item (12) mentioned above, wherein the product of sulfonation mentioned above is an emeraldine type polyaniline.

(14) A method according to the item (12) mentioned above, wherein the polyaniline mentioned above is a doped polyaniline using proton acid as a dopant.

(15) A water-soluble conducting polyaniline having solubility in the range of 0.1 to 10 wt. %, characterized by being produced by a method according to any of the items (1) to (14).

(16) A water-soluble conducting polyaniline having a surface resistance in the range of $1 \times 10^2$ to $1 \times 10^{12}$ $\Omega/\square$ characterized by being produced by a method according to any of the items (1) to (14).

(17) A method for the sulfonation of a polyamine or a derivative thereof, characterized by adding dropwise a sulfonating agent at a rate in the range of 0.5 to 8 kg/hr of unit time to 1 kg of a polyaniline or a derivative thereof having a water content in the range of 0 to 8 wt. % and meanwhile stirring the mixture consequently formed at an initial stirring power in the range of 0.03 to 0.3 kW/m$^3$.

DESCRIPTION OF PREFERRED EMBODIMENT

The method of this invention for producing a water-soluble conducting polyaniline is characterized by effecting sulfonation of a polyaniline or a derivative thereof with a sulfonating agent such as, for example, chlorosulfuric acid by a process of dispersing the polyaniline or the derivative thereof in an organic solvent and sulfonating the polyaniline or the derivative in the dispersed state without allowing aggregation thereof. The adoption of this process is based on the discovery that when the aggregation occurs at all, it results in lowering the degree of sulfonation and consequently rendering difficult the formation of a polyaniline which excels in not only solubility in water but also in conductivity.

This invention further concerns a method for producing a water-soluble conducting sulfonating polyaniline or a derivative thereof by a process of sulfonating a polyaniline or a derivative thereof with a sulfonating agent and subsequently hydrolyzing the product of sulfonation in a mixed solution of water with a hydrophilic organic solvent thereby introducing therein a sulfonic acid group. The adoption of this process is based on the discovery that the solubility of the water-soluble conducting polyaniline is varied by a difference in the method for hydrolyzing the sulfonated polyaniline. The water-soluble conducting polyaniline which is obtained in accordance with this invention exists in an aqueous solution. It can be made to form a thin film by such a simple technique as the spin coat and can then be used in the form of this thin film in various antistatic applications. Now, this invention will be described in detail below.

This invention uses a polyaniline or a derivative thereof as the raw material for the water-soluble conducting polyaniline. Since the conductivity of the raw material affects even the conductivity of the water-soluble conducting polyaniline which is the end product herein, the polyaniline or the derivative to be used is preferred to possess as high conductivity as permissible. In this respect, the polyaniline of emeraldine proves most preferable. The term "polyaniline of emeraldine" as used herein refers, for example, to what contains as a repeating unit a fundamental skeleton represented by the general formula (1) in which reducing units (phenylene diamine skeleton) and oxidizing units (quinone imine skeleton) are present at a ratio of 1:1.

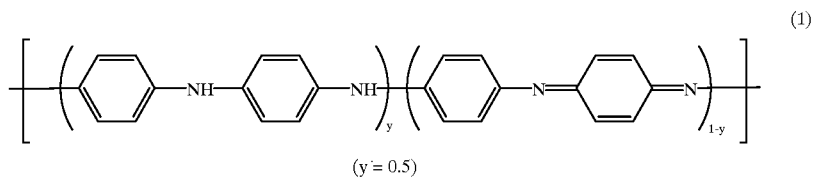

(1)

(y = 0.5)

This invention indiscriminately allows the emeraldine to be in the doped state (emeraldine salt) or in the undoped state (emeraldine base). It is nevertheless commendable to use the emeraldine in the doped state (emeraldine salt). Particularly, this invention prefers to use the polyaniline of this emeraldine or the derivative thereof which has been doped with a proton acid. When the polyaniline of emeraldine base is used, the acidic polymer obtained for the formation of the emeraldine base must be undoped after it has been neutralized with an alkali. The reason for the preferred use of the emeraldine salt is that the necessity for this extra process can be obviated. The dopant for the emeraldine salt is only required to be any of proton acids. The proton acids which can be used include hydrochloric acid, sulfuric acid, nitric acid, hydroborofluoric acid, perchloric acid, amide sulfuric acid, p-toluene sulfonic acid, acetic acid, propionic acid etc., for example.

Generally, the production of the polyaniline of emeraldine salt may be effected by any of the methods known to the art. The two kinds of method, i.e. the method for polymerization by dint of electrochemical oxidation and the method for polymerization by dint of chemical oxidation using an oxidizing agent, are available, for example. Either of them may be used, depending on the convenience of occasion. For the production to be effected on a commercial scale, the method of polymerization by dint of the chemical oxidation using an oxidizing agent is preferred over the other method. The polymerization of polyaniline through chemical oxidation may be accomplished by adding an oxidizing agent to an acidic or basic solution of a polyaniline and a derivative thereof and stirring them together. The polyaniline or the derivative thereof as the raw material for the sulfonation contemplated by this invention can be obtained by polymerizing aniline and an o- or a m-substituted aniline by dint of electrochemical or chemical oxidation.

The polyaniline of this description can be prepared by polymerizing aniline through oxidation. The oxidizing agent to be used for the polymerization may be any of the oxidizing agents which can oxidize aniline at all. As concrete examples of the oxidizing agent, persulfates such as ammonium persulfate, sodium persulfate and potassium persulfate, persulfuric acid, hydrogen peroxide, and ferric chloride may be cited. Persulfates represented by ammonium persulfate prove particularly preferable. The oxidizing agent is used at a ratio in the range of 0.1 to 5 mols, preferably 0.5 to 1.5 mols, to 1 mol of the monomer.

As concrete examples of the solvent for the polymerization of aniline, water, methanol, ethanol, isopropanol, acetonitrile, dimethyl formamide, acetone, 2-butanone, dimethyl acetamide etc. may be cited. Among other solvents mentioned above, water and methanol prove particularly preferable.

Properly, the reaction temperature of the polymerization is in the range of −15° C. to 70° C., preferably in the range of −10° C. to 20° C. The reason for this range is that a polyaniline derivative possessing a fine conductivity is obtained at a reaction temperature in this range. The term "derivative of polyaniline" as used herein means the product of addition of such a substituent as an alkyl group of 1 to 20 carbon atoms, an alkoxy group of 1 to 20 carbon atoms, a thioalkyl group of 1 to 20 carbon atoms, a carboxy ester group of 1 to 20 carbon atoms, or a cyano group or a halogen atom such as fluorine atom, chlorine atom, bromine atom, or iodine atom to the aromatic ring of an aniline.

This invention, though not required to limit the polyaniline to what is obtained by the method of production mentioned above, disperses the polyaniline obtained as described above or the derivative thereof in an organic solvent and then sulfonates it.

Properly, the polyaniline or the derivative to be used for the sulfonation has a water content in the range of 0 to 8 wt. %, preferably 0 to 5 wt. %. If the water content exceeds 8 wt. %, the excess water generates sulfuric acid from the sulfonating agent and the sulfonated polyaniline or the derivative thereof absorbs the sulfuric acid and, as a result, the substantial aggregation of the polyaniline or the derivative thereof possibly gives rise to lumps of grains. The term "substantial" as used herein means that the aggregation of the polyaniline or the derivative thereof is tolerable so long as it avoids interfering with the sulfonation. The size of the lumps of grains does not need to be particularly restricted because it has only to be rated from the viewpoint of the advance of the sulfonation of the polyaniline, for example. The lumps of grains, however, are preferred to have a diameter of not more than 100 mm. If the lumps of grains have a diameter exceeding 10 mm, the sulfonated polyaniline will fail to attain uniform introduction of sulfonic acid group and possibly suffer degradation of solubility. If the formation of lumps of grains due to the substantial aggregation proceeds heavily, it will possibly result in breakage of the reaction vessel.

The solvent for the reaction of sulfonation may be any of the solvents which dissolve or disperse the polyaniline or the derivative thereof and avoid reacting with the sulfonating agent. As concrete examples of the solvent answering this description, carbon disulfide, carbon tetrachloride, 1,1,2,2-tetrachloroethane, 1,2-dichloroethane, chloroform, dichloromethane etc. may be cited. Among other solvents mentioned above, 1,2-dichloro-ethane and 1,1,2,2-tetrachloroethane prove particularly preferable because of high compatibility with chlorosulfuric acid.

Properly, the amount of the polyaniline or the derivative thereof to be charged relative to the solvent is in the range of 1 to 30 wt. %. If this amount exceeds 30 wt. %, the polyaniline or the derivative thereof will not be uniformly dispersed in the solvent and will tend to induce conspicuous formation of lumps of grains due to aggregation. Conversely, if this amount is less than 1 wt. %, the shortage will impair the productivity.

As concrete examples of the sulfonating agent to be used in this invention, concentrated sulfuric acid, fuming sulfuric acid, $SO_3$, chlorosulfuric acid, and fluorosulfuric acid may be cited. Among other sulfonating agents mentioned above, chlorosulfuric acid proves particularly preferable. If sulfuric acid is present copiously during the process of sulfonation, the polyaniline or the derivative thereof will absorb the sulfuric acid and, as a result, aggregate and give rise to lumps of grains. In this respect, the chlorosulfuric acid is capable of repressing such aggregation because it allows no copious presence of sulfuric acid during the course of the reaction. Further, since the chlorosulfuric acid is the product of the reaction of hydrogen chloride with sulfuric anhydride, it forms hydrochloric acid during the course of the reaction and this hydrochloric acid dopes the polyaniline. As a result, the proton of the added sulfonic acid group assumes a freed state and the produced sulfonated polyaniline acquires high solubility in neutral water.

Properly, the amount of the chlorosulfuric acid to be added for the sulfonation is such as to give 0.5 to 10 sulfonic acid groups, preferably 0.5 to 3 sulfonic acid groups, per one aromatic ring of the polyaniline or the derivative thereof. If the number of sulfonic acid groups present during the reaction is less than 0.5, the solubility of the sulfonated polyaniline in water is unduly low because only not more than one sulfonic acid group is introduced per two aromatic rings. If the number of sulfonic acid groups present during the reaction exceeds 10, the sulfonated polyaniline will tend to introduce sulfonic acid groups excessively and will suffer degradation of conductivity in spite of improvement in solubility.

Properly, the initial stirring power for the reaction of sulfonation is in the range of 0.03 to 0.3 $kW/m^3$, preferably 0.04 to 0.15 $kW/m^3$. If this power is less than 0.03 $kW/m^3$, the polyaniline will aggregate and form lumps of grains on the wall of the reaction vessel or in the bottom thereof. If the lumps of grains exceed 10 mm in diameter, the sulfonated polyaniline will fail to effect uniform introduction of sulfonic acid group and tend to suffer degradation of solubility. Conversely, if the power exceeds 0.3 $kW/m^3$, the excess will be at a disadvantage in inducing fast deposition of polyaniline in the shape of a mortar on the inner wall of the reaction vessel. The stirring power can be adjusted in a such range by calculating the volume of a stirring machine, the size of stirring vanes, and the speed of stirring. Specifically, this adjustment is attained by the stirring speed.

Properly, the speed of the addition of the sulfonating agent is in the range of 0.5 to 8 kg/hr, preferably 1 to 8 kg/hr, per kg of polyaniline, without reference to the kind of sulfonating agent to be used. The coagulation of the polyaniline or the derivative thereof may be logically explained by a postulate that the polyaniline or the derivative thereof absorbs the sulfuric acid to be formed directly or indirectly by the sulfonating agent. The reason for setting the upper limit of the speed of dropwise addition at 8 kg/hr is that the surpass of this limit induces sudden formation of sulfuric acid, prevents the polyaniline from being uniformly dispersed in the organic solvent, and tends to aggregate the polyaniline to the extent of giving rise to lumps of grains exceeding 10 mm in diameter. The formation of such lumps of grains has the possibility of impeding the sulfonation from proceeding uniformly and the aggregation, when occurring heavily, breaking the reaction vessel. If this speed is less than 0.5 kg/hr, the shortage will be at a disadvantage in retarding the reaction and degrading the production efficiency.

Properly, the temperature of the reaction of sulfonation is in the range of 20° C. to 200° C., preferably 40° C. to 150° C., and particularly preferably 50° C. to 100° C. The reason for this range is that the sulfonation performed in this range impart excellent solubility and conductivity to the produced sulfonated polyaniline.

Properly in this invention, the product of sulfonation of the polyaniline or the derivative thereof has lumps of grains not exceeding 10 mm, preferably not exceeding 5 mm, in diameter. The reason for the maximum limit is that larger lumps of grains have the possibility of lowering the degree of sulfonation and degrading the solubility in water.

In this invention, the product of sulfonation of the polyaniline or the derivative thereof in the reaction solution is separated by filtration or centrifugation from the reaction solution and then hydrolyzed in the mixed solution of water with a hydrophilic solvent.

The reaction of hydrolysis is attained by heating the product of sulfonation in a water-containing hydrophilic organic solvent. The hydrophilic organic solvent which can be used for this hydrolysis has only to be mixable with water. As concrete examples of the hydrophilic organic solvent answering this description, alcohols such as methanol, ethanol, 1-propanol, and 2-propanol, ketones such as acetone and methyl-ethyl ketone, cellosolves such as methoxy ethanol and ethoxy ethanol, and acetonitrile may be cited. Particularly, the alcohols such as methanol, ethanol, 1-propanol, and 1-propanol prove preferable on account of the high compatibility thereof with the chlorosulfonylated polyaniline or the derivative thereof. The alcohols such as methanol, ethanol, 1-propanol, and 1-propanol are particularly suitable for quantity production of the sulfonated polyaniline or the derivative thereof because they can be easily extracted from the reaction solution containing the sulfonated polyaniline or the derivative thereof.

Properly, the amount of the hydrophilic organic solvent to be charged for the reaction of hydrolysis is in the range of 5 to 18, preferably 5 to 15, based on the unity, 1, of water. If this amount is less than 5, the product of the reaction of hydrolysis will be completely dissolved in the solvent after the hydrolysis and will not be easily extracted from the solvent. Conversely, if this amount exceeds 18, though the product to be obtained will be nearly insoluble in the solvent, the reaction of hydrolysis will not proceed fully satisfactorily and the solubility of the product in water will tend to decrease. This invention hydrolyzes the sulfonated polyaniline or the derivative thereof by using the mixed solution of water with the hydrophilic organic solvent. This hydrolysis excels the hydrolysis performed solely with water in the capability of allowing quantity production on the commercial scale because it permits very easy removal of the hydrophilic organic solvent.

Properly, the amount of the sulfonated polyaniline or the derivative thereof to be charged in the mixed solution of water with the hydrophilic organic solvent for the reaction of hydrolysis is in the range of 0.1 to 30 wt. %, preferably 1 to 20 wt. %. If this amount exceeds 30 wt. %, the hydrolysis will not proceed fully satisfactorily. Conversely, if it is less than 0.1 wt. %, the amount of the solution will be unduly large for economic use. The reason for the range mentioned above is that the reaction efficiency is excellent in this range.

The reaction temperature at this time is properly in the range of 40 to 120° C., preferably 40 to 80° C. If the temperature deviates from the range, the solubility or the conductivity will tend to decrease.

The polymerization degree of the water-soluble conducting polyaniline contemplated by this invention is in the range of 2 to 10,000, preferably 20 to 1,000. The solubility thereof in water (25° C.) is not less than 0.5 wt. %, preferably not less than 3 wt. % while the polyaniline assumes an electric conductivity of not less than $10^{-6}$ S/cm, preferably not less than $10^{-4}$ S/cm. When the polyaniline satisfies these conditions, it can be used most advantageously for such applications as various transparent electrodes, electromagnetic wave shielding agents, photoelectric conversion elements, and organic electroluminescence elements.

The water-soluble conducting polyaniline to be produced by this invention has the aromatic rings of the polyaniline skeleton thereof substituted by an average of 0.1 to 4 $SO_3M$'s and an average of 0 to 3.9 R's (providing that the total of the number of $SO_3M$ and the number of R is 4) per one aromatic ring and doped with 0.025 to 1 external dopant per nitrogen atom in the main skeleton mentioned above (exclusive of the nitrogen atoms in the substituent).

The symbol M in $SO_3M$ is selected from the group consisting of hydrogen atom, alkali metals (such as, for example, sodium, potassium, rubidium etc.), alkaline earth metals (such as, for example, calcium and magnesium etc.), and ammonium group. Hydrogen atom is preferred over the other members of the group.

The symbol R represents at least one member selected from the class consisting of a hydrogen atom, halogen atoms, preferably a chlorine atom, a fluorine atom, and a bromine atom, alkyl groups of 1 to 20 carbon atoms, preferably 1 to 8 carbon atoms, alkoxy groups of 1 to 20 carbon atoms, preferably 1 to 8 carbon atoms, alkylthio groups of 1 to 20 carbon atoms, preferably 1 to 8 carbon atoms, alkylamino groups of 1 to 20 carbon atoms, preferably 1 to 8 carbon atoms, a carboxyl group, carboxylic ester groups whose ester residue has 1 to 20 carbon atoms, preferably 1 to 8 carbon atoms, a nitro group, and a cyano group. Among other members of the class mentioned above, such electron donating groups as hydrogen atom, alkyl groups, alkoxy groups, alkylthio groups, and alkylamino groups prove to be particularly advantageous.

Preferably, the average number of $SO_3M$'s is in the range of 0.5 to 1.5 and the average number or R's is in the range of 2.5 to 3.5. It is provided, however, that the total of the number of $SO_3M$'s and the number of R's is 4. Further, each nitrogen atom in the main skeleton of the polyaniline is doped with 0.025 to 1, preferably 0.1 to 0.5, external dopant per nitrogen atom.

The water-soluble conducting polyaniline produced by this invention possesses as an essential repeating unit thereof a repeating unit represented by the general formula (2) [wherein M and R have the same meanings as defined above, p represents a numerical value in the range of 0.1 to 4, q represents a numerical value in the range of 0 to 3.9 (providing that p+q=4), X represents the anions of the proton acid as the dopant, and n represents the value of the anions which is generally 1 to 3, preferably 1 to 2] and, when necessary, further possesses a repeating unit represented by the formula (3) and/or the formula (4) and other repeating unit.

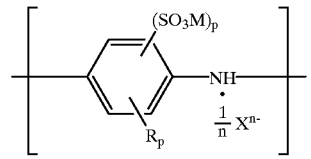

(2)

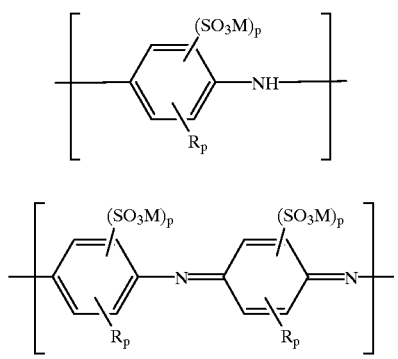

The anions of proton acids include monovalent through trivalent anions such as chloride ion (such as, for example, chlorine ion), bromide ion (such as, for example, bromine ion), iodide ion (iodine ion), nitrate ion, sulfate ion, phosphate ion, borofluoride ion, perchlorate ion, thiocyanate ion, acetate ion, propionate ion, p-toluene sulfonate ion, trifluoroacetate ion, and trifluoromethane sulfonate ion. Among other anions mentioned above, monovalent and divalent anions prove particularly advantageous.

As a typical example, the water-soluble conducting polyaniline obtained in accordance with this invention by the use of chlorosulfuric acid as the sulfonating agent is found by elementary analysis to have a nitrogen/sulfur ratio in the range of 8/8 to 8/5, a fact the sulfonic acid groups are introduced at a ratio of 5 to 8 to 8 aromatic rings. It has the chloride ion thereof doped at a doping ratio in the range of 50 to 100%. Thus, this is the externally doped type sulfonated polyaniline which is different from the self-doped type polyaniline.

By the method of production according to this invention, the water-soluble conducting polyaniline can be obtained in the form of an aqueous solution because the compound exhibits high solubility in water. This polyaniline, therefore, can be directly applied to a substrate from this sole aqueous solution to allow easy manufacture of a thin film. This aqueous solution, when necessary for improving the applying property, the fast adhesion to the substrate, the strength of the film, and the water resistance, may be used as blended with a water-soluble polymer or an aqueous type polymer emulsion. Such simple techniques as spin coat, dip coat, and bar coat are available for the formation of the thin film. The water-soluble conducting polyaniline or the derivative thereof thus obtained, therefore, can be utilized for various antistatic applications such as transparent electrodes, electromagnetic wave shielding materials, photoelectric conversion elements, organic electroluminescence elements, organic electrochromic elements, rustproofing agents, semiconductor photocatalysts, photoresists, and nonlinear optical materials.

The polyaniline, the water-soluble conducting polyaniline of this invention, and the antistatic agent using it can be tested for electric conductivity by subjecting a compressed pellet sample or a film sample obtained by coating an aqueous solution to the DC four-terminal method. The antistatic film obtained by coating the aqueous solution of a resin composition resulting from blending the water-soluble conducting polyaniline of this invention with a general-purpose water-soluble polymer can be tested for surface resistance by vacuum depositing a metal electrode on the film and subjecting the coated film to the two terminal method.

According to this invention, the polyaniline which possesses exceptionally fine solubility in water can be easily produced on a commercial scale. The characteristic properties of the polyaniline or the derivative thereof are closely related with the method used for the production. The polyaniline or the derivative which excels in solubility in water is produced with extreme difficulty unless the sulfonation is attained uniformly. According to this invention, however, by dispersing a polyaniline or a derivative thereof in an organic solvent and sulfonating it without allowing it to aggregate, it is made possible to effect uniform sulfonation and produce the polyaniline or the derivative thereof which excels in solubility in water and in conductivity as well. Further, owing to the sulfonation with chlorosulfuric acid and the reaction of hydrolysis in the mixed solution of water with a hydrophilic solvent, it is made possible to produce a polyaniline derivative which excels in solubility even in a neutral aqueous solution and in conductivity as well. This reaction further makes it possible to decrease the amount of chlorosulfuric acid to be used and, from the viewpoint of the conversation of environment, facilitate the disposal of a spent acid.

The water-soluble conducting polyaniline which is obtained by this invention excels in solubility in water and the aqueous solution consequently obtained can be made to form a thin film by such a simple technique as spin coat, dip coat, or bar coat and can be utilized for various antistatic applications such as transparent electrodes, electromagnetic wave shielding materials, photoelectric conversion elements, organic electroluminescence elements, organic electrochromic elements, rustproofing agents, semiconductor photocatalysts, photoresists, and nonlinear optical materials.

EXAMPLES

Now, the present invention will be described in detail below with reference to working examples. The polyaniline and the sulfonated polyaniline produced by this invention were tested for electric conductivity by a procedure of forming compressed pellets of their respective powders with a tablet forming device and analyzing the pellets by the DC four-terminal method. During this analysis, a constant current of 1 $\mu$A was supplied from a constant current source (made by Keithley Instrument Inc. and sold under the product code of "Type 220") to the two outer terminals and the potential difference consequently generated between the two inner terminals was measured with a digital multimeter (made by Keithley Instrument Inc. and sold under the product code of "Type 2001"). The surface resistance of the antistatic thin film produced by this invention was determined by a procedure of vacuum depositing a comb-shaped metallic electrode on the thin film with a vacuum deposition device (produced by Shinku Kiko Co., LTD. and sold under the trademark designation of "VPC-410") and measuring the surface resistance by the two-terminal method using an insulation resistance tester (produced by Keithley Instrument Inc. and sold under the product code of "Type 6517"). The thickness of the thin film was measured with a tapping mode interelectron microscope of the scanning probe microscope (made by Digital Instruments and sold under the trademark designation of "Nanoscope IIIa"). The water content of the polyaniline was determined with a Karl Fischer moisture meter (made by Kyoto Electronics Manufacturing Co., LTD. and sold under the product code of "MAK-500").

Example of Synthesis 1

To 10 liters of an aqueous 1.2 mols/liter hydrochloric acid solution, 930 g of aniline was added dropwise as kept stirred.

The resultant mixture was cooled to 10° C. A solution of 2.8 kg of ammonium persulfate in 5.1 kg of deionized water was added dropwise to the cooled mixture over a period of four hours. After the dropwise addition was completed, the produced mixture was further stirred overnight at 10° C. The green precipitate which consequently occurred was separated by filtration and washed with deionized water until the color of the precipitate ceased to exist. The filtrate was further washed with methanol until the color of the filtrate ceased to exist. The dry weight of the washed filtrate was 1.03 kg. The produced polyaniline was molded in pellets. The pellets, on analysis by the four-terminal method, were found to have electric conductivity of 4.4 S/cm. They were found by the analysis with a Karl Fischer moisture meter to have a water content of 2.3 wt. %.

Example 1

In 440 g of 1,2-dichloroethane, 17.5 g of the polyaniline hydrochloride obtained in Example of Synthesis 1 was dispersed by stirring and meanwhile heated to 80° C. The initial stirring power used in this case was 0.043 kW/m$^3$. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. During the course of the reaction, any sign of the occurrence of lumps of grains exceeding 10 mm in diameter owing to aggregation was not observed. The reaction product was cooled and separated by filtration. The wet cake consequently obtained was dispersed by stirring in 300 g of a 1/9 mixed solution of water/2-propanol and the produced dispersion was left hydrolyzing at 60° C. for four hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 24 g. The dry cake, when tested for solubility in water at room temperature, was found to have a solubility of 5.5 wt. %.

The sulfonated polyaniline consequently obtained was prepared as an aqueous 5 wt. % solution. This solution was applied by spin coat on a slide glass to form a thin film. The thin film was found to have a thickness of 0.18 μm and a surface resistance of 3.0×10$^6$ Ω/□. The results are shown in Table 1.

Example 2

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product was cooled and separated by filtration. The wet cake consequently obtained was dispersed in 300 g of a 1/9 mixed solution of water/2-propanol (IPA) and the produced dispersion was left hydrolyzing at 50° C. for four hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 25 g. The dry cake, when tested for solubility in water at room temperature, was found to have a solubility of 5.9 wt. %.

The sulfonated polyaniline consequently obtained was prepared as an aqueous 5 wt. % solution. This solution was applied by spin coat on a slide glass to form a thin film. The thin film was found to have a thickness of 0.23 μm and a surface resistance of 3.7×10$^6$ Ω/□. The results are shown in Table 1.

Example 3

In 390 g of 1,2-dichloroethane, 35.0 g of the polyaniline hydrochloride obtained in Example of Synthesis 1 was dispersed and meanwhile heated to 80° C. A solution of 88 g of chlorosulfuric acid in 88 g of 1,2-dichloroethane was added dropwise to the dispersion obtained above over a period of 120 minutes. After the dropwise addition was completed, the produced mixture was left reacting at 80° C. for five hours. The reaction product was cooled and separated by filtration. The wet cake consequently obtained was dispersed in 300 g of a 1/9 mixed solution of water/2-propanol and the produced dispersion was left hydrolyzing at 60° C. for four hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 48 g. The dry cake, when tested for solubility in water at room temperature, was found to have a solubility of 6.0 wt. %.

The sulfonated polyaniline consequently obtained was prepared as an aqueous 5 wt. % solution. This solution was applied by spin coat on a slide glass to form a thin film. The thin film was found to have a thickness of 0.18 μm and a surface resistance of 3.2×106 Ω/□. The results are shown in Table 1.

Example 4

In 440 g of 1,2-dichloroethane, 17.5 g of the polyaniline hydrochloride obtained in Example of Synthesis 1 was dispersed and meanwhile heated to80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product was cooled and separated by filtration. The wet cake consequently obtained was dispersed in 300 g of a 1/9 mixed solution of water/2-propanol and the produced dispersion was left hydrolyzing at 75° C. for four hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 22 g. The dry cake, when tested for solubility in water at room temperature, was found to have a solubility of 5.9 wt. %.

The sulfonated polyaniline consequently obtained was prepared as an aqueous 5wt. % solution. This solution was applied by spin coat on a slide glass to form a thin film. The thin film was found to have a thickness of 0.16 μm and a surface resistance of 1.6×10$^7$ Ω/□. The results are shown in Table 1.

Example 5

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product was cooled and separated by filtration. The wet cake consequently obtained was dispersed in 300 g of a 1/9 mixed solution of water/2-propanol and the produced dispersion was left hydrolyzing at 75° C. for two hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 21 g. The dry cake, when tested for solubility in water at room temperature, was found to have a solubility of 5.8 wt. %.

The sulfonated polyaniline consequently obtained was prepared as an aqueous 5 wt. % solution. This solution was applied by spin coat on a slide glass to form a thin film. The thin film was found to have a thickness of 0.15 $\mu$m and a surface resistance of $9.0 \times 10^6$ $\Omega/\square$. The results are shown in Table 1.

Example 6

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product was cooled and separated by filtration. The wet cake consequently obtained was dispersed in 300 g of a 1/9 mixed solution of water/2-propanol and the produced dispersion was left hydrolyzing at 50° C. for 16 hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 23 g. The dry cake, when tested for solubility in water at room temperature, was found to have a solubility of 7.2 wt. %.

The sulfonated polyaniline consequently obtained was prepared as an aqueous 5 wt. % solution. This solution was applied by spin coat on a slide glass to form a thin film. The thin film was found to have a thickness of 0.18 $\mu$m and a surface resistance of $3.9 \times 10^6$ $\Omega/\square$. The results are shown in Table 1.

Example 7

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product was cooled and separated by filtration. The wet cake consequently obtained was dispersed in 600 g of a 1/9 mixed solution of water/2-propanol and the produced dispersion was left hydrolyzing at 75° C. for two hours. The resultant product of hydrolysis was cooled and the green slurry solution consequently formed was filtered to obtain a green cake. This green cake was cleaned with 2-propanol until the filtrate ceased to assume any color. The dry weight of the cleaned cake was 21 g. The dry cake, when tested for solubility in water at room temperature, was found to have a solubility of 8.0 wt. %.

The sulfonated polyaniline consequently obtained was prepared as an aqueous 5 wt. % solution. This solution was applied by spin coat on a slide glass to form a thin film. The thin film was found to have a thickness of 0.15 $\mu$m and a surface resistance of $1.8 \times 10^7$ $\Omega/\square$. The results are shown in Table 1.

Control 1

A reaction was performed by following the procedure of Example 1 while the stirring power was changed to 0.019 kW/m$^3$. In 440 g of 1,2-dichloroethane, 17.5 g of the polyaniline hydrochloride obtained in Example of Synthesis 1 was dispersed by stirring and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The polyaniline nearly wholly aggregated in the form of a sheet of lumps of grains and adhered fast to the inner wall and the bottom of the reaction vessel. The reaction product consequently formed was cooled and separated by filtration. The resultant wet cake was dispersed by stirring in 300 g of a 1/9 mixed solution of water/2-propanol and the dispersion was left hydrolyzing at 60° C. for four hours. The green slurry solution consequently formed was cooled and separated by filtration to obtain a green cake. This green cake was washed with 2-propanol until the filtrate ceased to assume any color.

The dry weight of the cleaned cake was 25 g. When the sulfonated polyaniline consequently obtained was prepared as an aqueous 3 wt. % solution, an insoluble portion was observed in the solution. The results are shown in Table 1.

Control 2

A reaction was performed by following the procedure of Example 1 while changing the water content of polyaniline to 10 wt. %. The polyaniline hydrochloride, 17.5 g in amount, obtained in Example of Synthesis 1 was left standing and absorbing water until the water content reached 10 wt. % (about 1.3 g). In the wet polyaniline hydrochloride, 440 g of 1,2-dichloroethane was dispersed by stirring and meanwhile heated to 80° C. A solution of 44 g of chlorosulfuric acid in 44 g of 1,2-dichloroethane was added dropwise to the dispersion obtained above over a period of 60 minutes. In about 10 minutes after completion of the dropwise addition, the polyaniline was nearly wholly aggregated in the form of balls of lumps of grains. The reaction in process was stopped because the stirring was no longer carried out easily. The results are shown in Table 1.

Control 3

A reaction was performed by following the procedure of Example 1 while changing the period of the dropwise addition of the sulfonating agent to 15 minutes. In 440 g of 1,2-dichloroethane, 17.5 g of the polyaniline hydrochloride obtained in Example of Synthesis 1 was dispersed by stirring and meanwhile heated to 80° C. A solution of 44 g of chlorosulfuric acid in 44 g of 1,2-dichloroethane was added dropwise to the dispersion obtained above over a period of 15 minutes. After the dropwise addition was completed, the produced mixture was left reacting at 80° C. for five hours. The polyaniline nearly wholly aggregated in the form of a sheet of lumps of grains and adhered fast to the inner wall and the bottom of the reaction vessel. The reaction product consequently formed was cooled and separated by filtration. The resultant wet cake was dispersed by stirring in 300 g of a 1/9 mixed solution of water/2-propanol and the dispersion was left hydrolyzing at 60° C. for four hours. The green slurry solution consequently formed was cooled and separated by filtration to obtain a green cake. This green cake was washed with 2-propanol until the filtrate ceased to assume any color.

The dry weight of the cleaned cake was 24 g. When the sulfonated polyaniline consequently obtained was prepared as an aqueous 3 wt. % solution, an insoluble portion was observed in the solution. The results are shown in Table 1.

Control 4

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product consequently formed was cooled and separated by filtration. The resultant wet cake was dispersed in 300 g of a 1/9 mixed solution of water/2-propanol and the dispersion was left hydrolyzing at 30° C. for 16 hours. The green slurry solution consequently formed was cooled and separated by filtration to obtain a green cake. This green cake was washed with 2-propanol until the filtrate ceased to assume any color. The dry weight of the cleaned cake was 28 g. When the dry cake was tested for solubility in water at room temperature, it was found to have a solubility of not more than 3 wt. %. The results are shown in Table 1.

Control 5

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product consequently formed was cooled and separated by filtration. The resultant wet cake was dispersed in 300 g of a 1/9 mixed solution of water/2-propanol and the dispersion was left hydrolyzing at 75° C. for one hour. The green slurry solution consequently formed was cooled and separated by filtration to obtain a green cake. This green cake was washed with 2-propanol until the filtrate ceased to assume any color. The dry weight of the cleaned cake was 23 g. When the dry cake was tested for solubility in water at room temperature, it was found to have a solubility of not more than 3 wt. %. The results are shown in Table 1.

Control 6

In 390 g of 1,2-dichloroethane, 35.0 g of the polyaniline hydrochloride obtained in Example of Synthesis 1 was dispersed and meanwhile heated to 80° C. A solution of 88 g of chlorosulfuric acid in 88 g of 1,2-dichloroethane was added dropwise to the dispersion obtained above over a period of 120 minutes. After the dropwise addition was completed, the produced mixture was left reacting at 80° C. for five hours. The polyaniline nearly wholly aggregated in he form of a sheet of lump of grains and adhered fast to the inner and the bottom of the reaction vessel. The reaction product consequently formed was cooled and separated by filtration. The resultant wet cake was dispersed in 300 g of a 1/9 mixed solution of water/2-propanol and the dispersion was left hydrolyzing at 75° C. for two hours. The green slurry solution consequently formed was cooled and separated by filtration to obtain a green cake. This green cake was washed with 2-propanol until the filtrate ceased to assume any color. The dry weight of the cleaned cake was 23 g. When the dry cake was tested for solubility in water at room temperature, it was found to have a solubility of not more than 3 wt. %. The results are shown in Table 1.

Control 7

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product consequently formed was cooled and separated by filtration. The resultant wet cake was dispersed in 300 g of a 1/4 mixed solution of water/2-propanol and the dispersion was left hydrolyzing at 75° C. for two hours. The green slurry solution consequently formed was cooled and separated by filtration to obtain a green cake. This green cake was washed with 2-propanol until the filtrate ceased to assume any color. The dry weight of the cleaned cake was 18 g. When the dry cake was tested for solubility in water at room temperature, it was found to have a solubility of not more than 3 wt. %. The results are shown in Table 1.

Control 8

In 440 g of 1,2-dichloroethane, 17.5 g of the polyaniline hydrochloride obtained in Example of Synthesis 1 was dispersed and meanwhile heated to 80° C. A solution of 44 g of chlorosulfuric acid in 44 g of 1,2-dichloroethane was added dropwise to the dispersion obtained above over a period of 60 minutes. After the dropwise addition was completed, the produced mixture was left reacting at 80° C. for five hours. The reaction product consequently formed was cooled and separated by filtration. The resultant wet cake was dispersed in 300 g of a 1/19 mixed solution of water/2-propanol and the dispersion was left hydrolyzing at 75° C. for two hours. The green slurry solution consequently formed was cooled and separated by filtration to obtain a green cake. This green cake was washed with 2-propanol until the filtrate ceased to assume any color. The dry weight of the cleaned cake was 26 g. When the dry cake was tested for solubility in water at room temperature, it was found to have a solubility of not more than 3 wt. %. The results are shown in Table 1.

TABLE 1

| | Stirring power (kW/m³) | Period of dropwise addition (min) | Speed of dropwise addition (kg/hr) | Water content (%) | Lumps of grains resulting from aggregation | Maximum lumps of grains (mm)[a] | Insolubility | Water/IPA | Amount of mixed solution (ml) | Temperature (°C.) | Time of hydroxylation (hr) | solubility (wt %) | surface resistance (× 10⁻⁴ Ω/□) | S/N ratio |
|---|---|---|---|---|---|---|---|---|---|---|---|---|---|---|
| Example 1 | 0.043 | 60 | 2.51 | 2.3 | None | 5 | None | 1/9 | 300 | 60 | 4 | 5.5 | 3.0 | 0.73 |
| Example 2 | 0.043 | 60 | 2.51 | 2.3 | None | 2 | None | 1/9 | 300 | 50 | 4 | 5.9 | 3.7 | 0.75 |
| Example 3 | 0.15 | 120 | 1.26 | 2.3 | None | 7 | None | 1/9 | 300 | 60 | 4 | 6.0 | 3.2 | 0.75 |
| Example 4 | 0.043 | 60 | 2.51 | 2.3 | None | 3 | None | 1/9 | 300 | 75 | 4 | 5.9 | 16 | 0 |
| Example 5 | 0.043 | 60 | 2.51 | 2.3 | None | 3 | None | 1/9 | 300 | 50 | 2 | 5.8 | 9.0 | 0.73 |
| Example 6 | 0.043 | 60 | 2.51 | 2.3 | None | 2 | None | 1/9 | 300 | 75 | 16 | 7.2 | 3.9 | 0.76 |
| Example 7 | 0.043 | 60 | 2.51 | 2.3 | None | 2 | None | 1/9 | 600 | 50 | 2 | 8.0 | 18 | 0.80 |
| Control 1 | 0.019 | 60 | 2.51 | 2.3 | Exist | like sheet | Exist | 1/9 | 300 | 60 | 4 | <3.0 | — | 0.51 |
| Control 2 | 0.043 | 60 | 2.51 | 10 | Exist | 20 | Exist | — | — | — | — | — | — | — |
| Control 3 | 0.043 | 15 | 10.1 | 2.3 | Exist | like sheet | Exist | 1/9 | 300 | 60 | 4 | <3.0 | — | 0.21 |
| Control 4 | 0.043 | 60 | 2.51 | 2.3 | None | 5 | Exist | 1/9 | 300 | 30 | 16 | <3.0 | — | 0.72 |
| Control 5 | 0.35 | 60 | 2.51 | 2.3 | Exist | 4 | Exist | 1/9 | 300 | 75 | 1 | <3.0 | — | 0.72 |
| Control 6 | 0.043 | 60 | 2.51 | 2.3 | Exist | like sheet | Exist | 1/9 | 300 | 75 | 2 | <3.0 | — | 0.58 |
| Control 7 | 0.043 | 60 | 2.51 | 2.3 | None | 3 | Exist | 1/4 | 300 | 75 | 2 | <3.0 | — | 0.73 |
| Control 8 | 0.043 | 60 | 2.51 | 2.3 | None | 3 | Exist | 1/19 | 300 | 75 | 2 | <3.0 | — | 0.73 |

[a]Visual observation

The entire disclosure of Japanese Patent Application No.10-301251 filed on Oct. 22, 1998, and Japanese Patent Application No.10-301252 filed on Oct. 22, 1998 including specification, claims, drawing and summary are incorporated herein by reference in its entirety.

What is claimed is:

1. A method for the production of a water-soluble conducting polyaniline, characterized by adding dropwise a sulfonating agent at a rate in the range of 0.5 to 8 kg/hr of unit time to 1 kg of a polyaniline or a derivative thereof having a water content in the range of 0 to 8 wt. % and meanwhile stirring the mixture consequently formed at an initial power in the range of 0.03 to 0.3 kW/m$^3$ thereby sulfonating said polyaniline or said derivative and subsequently hydrolyzing the product of sulfonation, wherein said hydrolysis is carried out in a mixed solution of water with a hydrophilic organic solvent, with the concentration of said product of sulfonation of said polyaniline or said derivative thereof fallino in the range of 0.1 to 30 wt. %, at a temperature in the range of 40 to 120° C.

2. A method according to claim 1, wherein said sulfonating agent is a chlorosulfuric acid.

3. A method according to claim 1, wherein said reaction of sulfonation is performed in an organic solvent which avoids reacting with said sulfonating agent.

4. A method according to claim 1, wherein said polyaniline or said derivative thereof reacts in said organic solvent in a concentration of 1 to 30 wt. %.

5. A method according to claim 1, wherein said polyaniline is an emeraldine type polyaniline.

6. A method according to claim 1, wherein said polyaniline is a doped polyamine using proton acid as a dopant.

7. A method according to claim 1, wherein said formation of grain lumps due to substantial aggregation of a polyaniline is inhibited during said reaction of sulfonation of said polyaniline or said derivative thereof by the use of a sulfonating agent.

8. A method according to claim 1, wherein the aggregated lumps of the product of sulfonation of said polyaniline or said derivative thereof have the maximum size of not more than 10 mm.

9. A method according to the claim 1, wherein the mixing ratio of the water and said hydrophilic organic solvent is such that the proportion of said hydrophilic organic solvent falls in the range of 5 to 18 parts by weight, based on 1 part by weight of the water.

10. A method according to claim 1, wherein said hydrophilic organic solvent is an alcohol.

11. A method for the production of a water-soluble conducting polyaniline, characterized by hydrolyzing the product of sulfonation of a polyaniline or a derivative thereof in a mixed solution of water with a hydrophilic organic solvent, with the concentration of said product of sulfonation kept in the range of 0.1 to 30 wt. %, at a temperature in the range of 40 to 120° C.

12. A method according to claim 11, wherein said product of sulfonation is an emeraldine type polyaniline.

13. A method according to claim 11, wherein said polyaniline is a doped polyaniline using proton acid as a dopant.

14. A method according to claim 2, wherein said reaction of sulfonation is performed in an organic solvent which avoids reacting with said sulfonating agent.

15. A method according to claim 2, wherein said polyaniline or said derivative thereof reacts in said organic solvent in a concentration of 1 to 30 wt. %.

16. A method according to claim 3, wherein said polyaniline or said derivative thereof reacts in said organic solvent in a concentration of 1 to 30 wt. %.

17. A method according to claim 14, wherein said polyaniline or said derivative thereof reacts in said organic solvent in a concentration of 1 to 30 wt. %.

18. A method according to claim 9, wherein said hydrophilic organic solvent is an alcohol.

* * * * *